Aug. 25, 1936.   J. K. DELANO   2,052,540
OIL FILTER
Filed Dec. 2, 1933

Inventor
James K. Delano.
By
Attorney

Patented Aug. 25, 1936

2,052,540

UNITED STATES PATENT OFFICE 2,052,540

OIL FILTER

James K. Delano, New York, N. Y.

Application December 2, 1933, Serial No. 700,667

6 Claims. (Cl. 210—165)

This invention relates to an oil filter of that class which is designed for use with automobile and other engines or power plants where a quantity of lubricating oil is used and where it is desired to filter and clean the oil while it is still being used and without having to remove it from the engine.

The invention relates to that class of oil filters which comprises a casing that is mounted in the oil pumping line or in a by-pass thereof and through which the oil is circulated, the casing containing a renewable packing or cartridge of suitable filtering material through which the oil flows and within which the smaller particles of dirt and sediment are deposited, but in the usual style of oil filter now in use it has been found that the fillers of filtering material soon become saturated with the sediment which prevents the free oil from passing therethrough, thus rendering the cartridge useless in a short time.

It will readily be seen that when the oil containing dirt, sediment and other foreign matter is directed in a direct manner against the filtering material, said material will collect upon its surface all of the particles of dirt and sediment and will become pasted or coated with the same in such a manner that the oil can not pass therethrough or through the filtering material, and furthermore this dirt and sediment will be carried up into the filtering material and render the same useless in a short time.

The object of the present invention is to provide mechanical means whereby the inward flow of the oil is first diverted from the filtering material to a sediment chamber where it is carried through a spiral path for a considerable distance in order to allow the sediment to settle to a sump, and also for the flow of oil to lose its speed of travel so that it may readily be freed from the heavier particles of dirt and sediment which will fall downward into the sump, while the oil will rise up into and through the filtering material with a slow natural flow or speed of travel, and in this way the oil is first freed from the excess dirt and sediment before it enters the filtering material, thus preventing the filtering material from becoming clogged with the excess dirt and sediment and so prolonging the life of the cartridge.

In carrying out my invention, I employ a container or casing which is formed with a removable top and has a conical-shaped lower end in which is mounted adjacent the bottom a drain cock; this container is mounted in some suitable manner adjacent the engine and is connected in the oil feed or circulating line to which it is connected by an upper and lower pipe connection.

The interior of this container is divided into a filter chamber and a sediment or drain chamber, by two transverse partitions which are spaced apart; the upper one of which is formed with a central opening, and the lower one is formed with a series of small openings arranged adjacent to its outer edge.

To the under face of the lower partition is secured the upper edge of a spiral cone-shaped conveyor wall which extends downward within said sediment chamber to within a short distance of the bottom thereof.

The oil inlet or feed pipe enters the bottom of this sediment chamber and is formed with a stand-pipe in axial relation with said chamber and formed with a hooked end, closed and provided with a side outlet discharging the oil within the central coil of the conveyor wall and directing the flow of oil into said coil and the path formed thereby.

In this manner the oil is obliged to travel the path formed between the coils of the conveyor wall which is of a considerable length, thus allowing sufficient time within which for the oil to lose its momentum or speed of travel, so that the excess or heavier dirt and sediment will travel downward and drop into the sump; the oil rising and flowing up through the openings in the lower partition and up and through the central opening in the upper partition and up and through the filtering material contained in the filter chamber.

With these and other objects in view, my invention consists in certain novel construction and combination of parts as will hereinafter be fully described and claimed, and illustrated in the accompanying drawing which forms a part hereof and in which like figures of reference refer to corresponding parts in all of the views, and it is understood that slight changes may be made without departing from the spirit of the invention.

Figure 1:
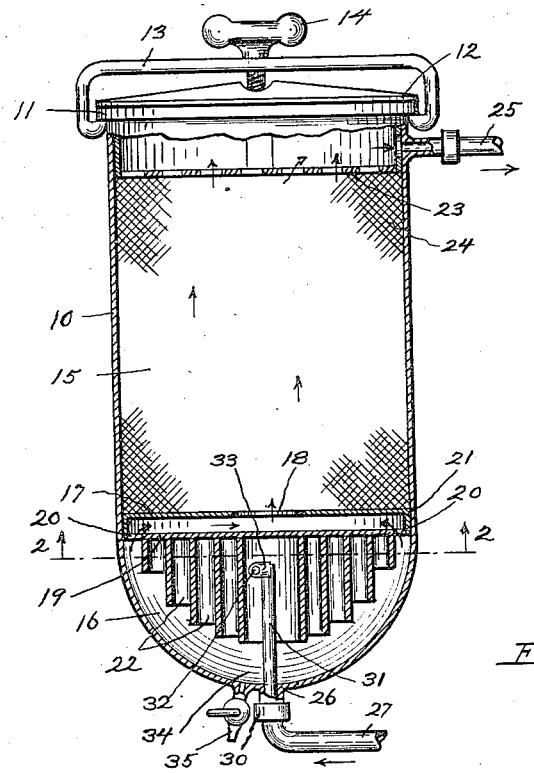
Figure 1 shows a vertical sectional view of an oil filter embodying my invention.
Figure 2:
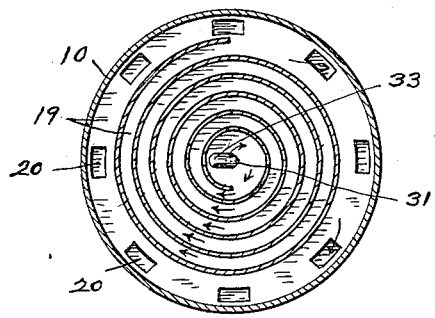
Figure 2 is a cross sectional view of the same, taken on the line 2—2 of Figure 1, looking upward and showing the spiral conveyor wall.

Referring to the drawing:

The filter comprises a container or casing 10 that may be of any desired shape in cross section, and of any size and material and provided with suitable means for mounting the same to or adjacent to the engine and its oil supply.

This container is formed with a flanged top edge 11 upon which is mounted a detachable cover 12, which is held in place by the yoke 13 and locking screw 14 in the usual manner.

The interior of the container is divided longitudinally into an upper filter chamber 15 and a lower sediment and drain chamber 16 by the upper partition 17 which is formed with a central opening 18, and the lower partition 19 which is formed with a series of openings 20 adjacent its edge, and is spaced from the upper partition 17 by the ring or spacer 21; this pair of partitions 17 and 19 may be either attached to the container 10 or mounted therein in a removable manner for the purpose of cleaning.

To the under surface of the partition 19 is secured in some suitable manner such as welding, a spiral conveyor wall 22, of which the inner coils are longer than the outer coils to conform to the conical sediment chamber 16 and which extend downward therein to within a short distance of the bottom thereof.

Within the upper end of the container 10 is placed a perforated cap 23 which rests upon the cartridge 24 which is composed of the filtering material and which is intended to be renewed from time to time.

Figure 3:
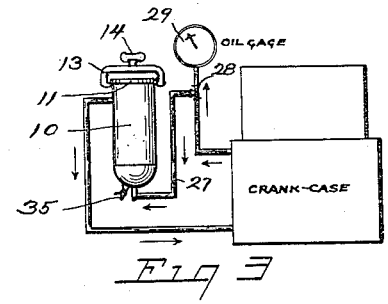
Figure 3 is a diagrammatic view to show the application of the device to an engine.

The upper end of the container 10 is connected in the oil pipe line by a return pipe 25 leading to the lower part of the crank case 26 as shown in Figure 3, and the bottom of the conical sediment chamber 16 is connected at its lowest point with the oil feed pipe 27 from a T 28 placed adjacent the oil gage 29.

This oil feed pipe 27 is connected to the sediment chamber by a nut 30 and is provided with a stand pipe 31 which extends upwards in said chamber 16 within the inner coil of the conveyor 22 and is formed with a closed end and a side opening 32 formed in a hooked end 33 in such a manner as to direct the flow of oil into the path formed by said spiral conveyor 22, in such a manner that the flow of oil will follow said conveyor path losing its speed as it travels and allowing the excess dirt and sediment to drop to the sump 34 and be drained off through the drain cock, while the oil will rise up through the openings 20 in the partition 19, between said partitions 19 and 17 and up through the opening 18 into and up through the filtering material 24, the cap 23 and out through the pipe 25 to the engine crank-case 26.

Having thus described my invention, what I claim as new and desire to secure by Letters Patent, is:—

1. In an oil filter, the combination with a casing adapted to be connected in a circulating oil system and formed with an upper filter chamber and a lower sediment chamber, a double walled partition mounted between said chambers having a central opening in its upper wall and peripheral openings in its lower wall for the purpose of interrupting the direct flow of oil from the sediment chamber to the filter chamber, said partition having intimate peripheral contact with the casing wall, renewal filtering material contained in said filter chamber, a helical-shaped spiral conveyor wall formed on the under surface of said partition forming a path for said oil and means for directing the entering oil into and through said spiral passage.

2. In an oil filter of the class described, the combination with a casing adapted to be connected in an oil circulating system and formed with an upper filtering chamber and a lower sediment chamber, of a double-walled transverse partition mounted within said casing between the filter chamber and the sediment chamber, and having intimate peripheral contact with the casing wall, the walls of said partition being spaced apart to form a passage, the upper wall having a central opening and the lower wall having peripheral openings to break up the direct passage of the oil from the sediment chamber to the filter chamber, an inverted helical-shaped conveyor depending from the lower face of the lower partition wall and extending into the sediment chamber, and means for delivering the oil from the circulating system into the center of the helical-shaped conveyor adjacent to the lower partition wall.

3. In a filter of the class described, the combination with a casing, of a double walled partition in the casing having intimate peripheral contact with the casing wall, said partition dividing the casing transversely into a receiving chamber and a sediment chamber, the walls of the partition defining a fluid receiving chamber, an inverted conical spiral wall depending from the partition into the sediment chamber to provide a spiral passage for the fluid, an inlet pipe discharging fluid centrally of the spiral passage, the lower wall of the partition having peripheral inlet openings therein affording fluid communication between the sediment chamber and said second receiving chamber, the upper wall of the partition having a centrally located discharge opening for directing flow of fluid from the second named receiving chamber axially into the first named receiving chamber.

4. In an oil filter of the class described, the combination with a casing adapted to be connected with a pressure oiling system, of a transverse partition having intimate contact with the casing wall to divide the same into upper and lower chambers, said partition comprising upper and lower walls defining a fluid receiving chamber therebetween, the upper wall having a central opening therein, and the lower wall having a series of peripheral openings, an inverted conical spiral depending from the lower wall to provide a spiral passage, a pipe extending through the bottom of the casing into the central convolution of the spiral to discharge fluid under pressure therein for passage into the spiral passage and thence into the fluid receiving chamber defined by the walls of the partition for discharge through the central opening axially of the casing.

5. In an oil filter, the combination with a casing, of a double walled partition in the casing having intimate contact with the casing wall and dividing the casing into upper and lower chambers, the walls of the partition being vertically spaced to define an intermediate fluid receiving chamber therebetween, the upper wall of the partition having a central fluid discharge opening therein, and affording communication between the upper chamber and the intermediate chamber, the lower wall of the partition having peripheral openings affording communication between the lower chamber and the intermediate chamber, and means for conducting fluid under pressure into the lower chamber, and through the inlet openings into the intermediate chamber for discharge therefrom through the central opening axially into the upper chamber.

6. In a filter of the class described, the combination with a casing, of a partition therein dividing the casing into a fluid receiving chamber and a sediment chamber, said partition having a fluid receiving chamber therein and having intimate peripheral engagement with the casing wall, a convolute wall on the partition depending into the sediment chamber to provide a spiral passage, a pipe extending into the sediment chamber and into the innermost convolution of the wall for discharging fluid under pressure into the spiral passage, and means for conducting fluid from the passage in circuitous path through the chamber of the partition for discharge axially into the casing.

JAMES K. DELANO.